(12) United States Patent
Moros

(10) Patent No.: US 11,095,172 B2
(45) Date of Patent: Aug. 17, 2021

(54) ELECTRIC MACHINE

(71) Applicant: MOLABO GmbH, Ottobrunn (DE)

(72) Inventor: Oleg Moros, Ismaning (DE)

(73) Assignee: MOLABO GmbH, Ottobrunn (DE)

( * ) Notice: Subject to any disclaimer, the term of this patent is extended or adjusted under 35 U.S.C. 154(b) by 58 days.

(21) Appl. No.: 16/323,248

(22) PCT Filed: Jul. 27, 2017

(86) PCT No.: PCT/EP2017/069046
§ 371 (c)(1),
(2) Date: Feb. 4, 2019

(87) PCT Pub. No.: WO2018/024606
PCT Pub. Date: Feb. 8, 2018

(65) Prior Publication Data
US 2019/0173330 A1   Jun. 6, 2019

(30) Foreign Application Priority Data
Aug. 5, 2016  (DE) .......................... 102016114569.6

(51) Int. Cl.
H02K 3/04 (2006.01)
H02K 1/16 (2006.01)
(Continued)

(52) U.S. Cl.
CPC ............... *H02K 1/16* (2013.01); *H02K 1/165* (2013.01); *H02K 1/26* (2013.01); *H02K 1/265* (2013.01);
(Continued)

(58) Field of Classification Search
CPC ............ H02K 1/165; H02K 3/48; H02K 3/02; H02K 3/12; H02K 3/345; H02K 3/487;
(Continued)

(56) References Cited

U.S. PATENT DOCUMENTS 2,094,358 A * 9/1937 Kilgore .................... H02K 3/24
310/262
2,221,567 A * 11/1940 Baudry .................... H02K 3/24
310/64
(Continued)

FOREIGN PATENT DOCUMENTS

| CN | 103580415 |   | 2/2014 |
| CN | 105811628 | A | 7/2016 |

(Continued)

OTHER PUBLICATIONS

Seinsch, H. O., "Grundlagen elektrischer Maschinen and Antriebe", Springer Fachmedien Wiesbaden GmbH 1993, 3. Auflage, pp. 146-154.

(Continued)

*Primary Examiner* — Thanh Lam
(74) *Attorney, Agent, or Firm* — Morgan, Lewis & Bockius LLP

(57) ABSTRACT

The invention relates to an electric machine (10) comprising a stator (11) which comprises a plurality of slots (14) and is adjacent to an air gap (17). The electric machine (10) further comprises a first material (15) having a first electrical conductivity, wherein the first material (15) in each case fills the slots (14) partially, and a second material (16) having a second electrical conductivity that is lower than the first electrical conductivity. The second material (16) exclusively fills an edge region (20) of the slots (14) and the edge region (20) is located in the slots (14) on the side facing the air gap (17). The first material (15) in the slots (14) is electrically conductively interconnected on a first side of the stator (11). The invention furthermore provides an electric machine (10) having a rotor (12).

15 Claims, 2 Drawing Sheets

(51) Int. Cl.
 *H02K 3/12* (2006.01)
 *H02K 1/26* (2006.01)
 *H02K 17/16* (2006.01)
 *H02K 3/487* (2006.01)
 *H02K 3/34* (2006.01)
 *H02K 3/48* (2006.01)

(52) U.S. Cl.
 CPC ............... *H02K 3/12* (2013.01); *H02K 3/345* (2013.01); *H02K 3/48* (2013.01); *H02K 3/487* (2013.01); *H02K 17/165* (2013.01)

(58) Field of Classification Search
 CPC .......... H02K 3/04; H02K 3/30; H02K 15/024; H02K 1/16; H02K 1/26; H02K 1/265; H02K 17/165
 USPC .. 310/201, 45, 210–215, 179–180, 184, 194
 See application file for complete search history.

(56) References Cited

U.S. PATENT DOCUMENTS

| | | | | |
|---|---|---|---|---|
| 2,252,440 | A * | 8/1941 | Safford | H02K 3/32 310/215 |
| 2,400,576 | A * | 5/1946 | Sigmund | H02K 15/12 204/475 |
| 2,663,808 | A * | 12/1953 | Kuehlthau | H02K 3/24 310/55 |
| 2,750,523 | A * | 6/1956 | Wiedemann | H02K 3/16 310/183 |
| 4,831,301 | A * | 5/1989 | Neumann | H02K 1/16 310/184 |
| 9,413,200 | B2 * | 8/2016 | Horisaka | H02K 3/18 |
| 2006/0131981 | A1 | 6/2006 | Bray et al. | |
| 2009/0026868 | A1 | 1/2009 | Morgante | |
| 2009/0152976 | A1 | 6/2009 | Bott et al. | |
| 2014/0028146 | A1 | 1/2014 | Sugimoto et al. | |
| 2016/0105061 | A1 | 4/2016 | Horisaka et al. | |
| 2017/0047804 | A1 | 2/2017 | Dajaku | |

FOREIGN PATENT DOCUMENTS

| | | |
|---|---|---|
| DE | 2906862 A1 | 9/1979 |
| DE | 102006047975 A1 | 4/2008 |
| DE | 102008000706 A1 | 9/2009 |
| DE | 102010043384 A1 | 9/2009 |
| DE | 102014105642 A1 | 10/2015 |
| DE | 112013007001 T5 | 1/2016 |
| EP | 0280194 A2 | 8/1988 |
| EP | 2149964 A2 | 2/2010 |
| EP | 2282396 B1 | 2/2011 |
| GB | 2015829 A | 9/1979 |
| JP | H05284701 A | 10/1993 |
| JP | 2001136701 A | 5/2001 |
| JP | 2010183741 A | 8/2010 |
| KR | 20110048537 A | 5/2011 |
| WO | 2008043688 A1 | 4/2008 |
| WO | WO-2015159332 A1 | 4/2017 |

OTHER PUBLICATIONS

"Common Data in Wireless Communication", Beijing Design Institute of the Ministry of Posts and Telecommunications, Aug. 31, 1987, p. 84.

Heller, B. et al., "Harmonic Field Effects in Induction Machines", China Machine Press, Sep. 20, 1980, p. 302.

Pospelov, "Aviation Motor Structure", Aviation Industry Press, Apr. 30, 1987, p. 181.

"Motor Repairman Technology" published in Jul. 1985, pp. 205-206.

* cited by examiner

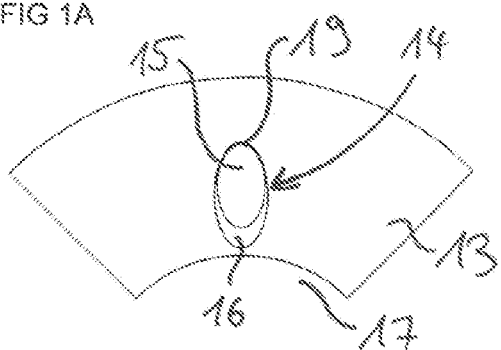
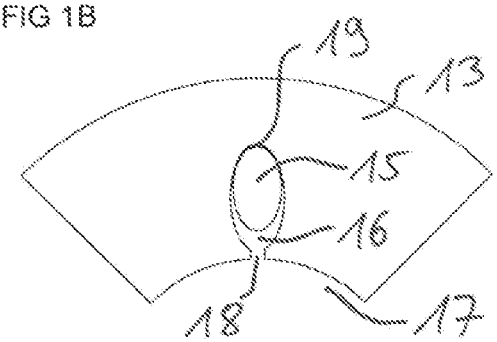
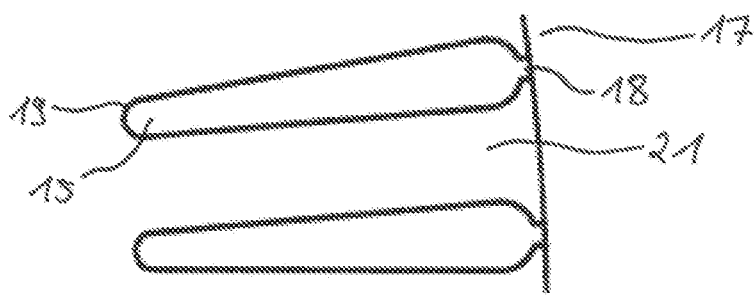
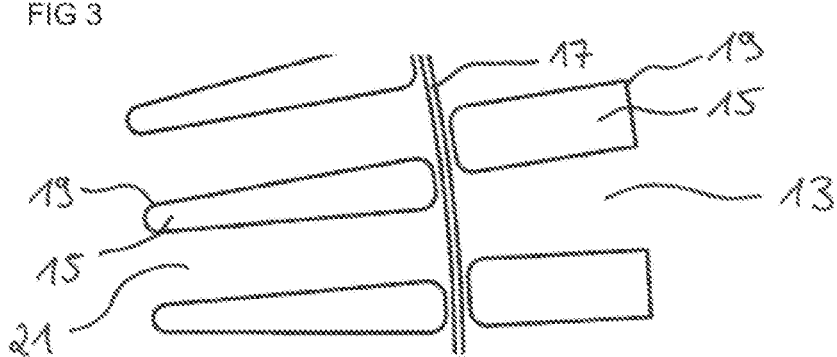
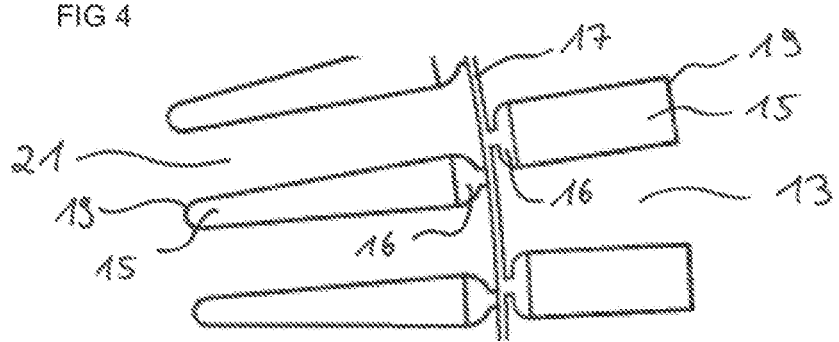

ELECTRIC MACHINE

The present invention relates to an electric machine. The electric machine may comprise a stator and a rotor that is mounted so as to be movable relative to said stator.

Electric machines can be operated as a motor or as a generator. The stator may comprise an electrical winding in slots, which winding is formed of an electrically conductive material and has the shape of a rod for example. The electrical winding is connected to a power system which may be multiphase.

If the slots are largely filled with the conductors of the electrical winding, it is possible to achieve high current densities in the electrical winding, and thus low DC resistance levels during operation of the electric machine. If a slot is completely filled with an electrical winding, an induced magnetic field, the transverse field of the slots, penetrates the electric machine during operation. As a result, voltages, and thereby in turn eddy currents, are induced in the electrical winding. The induced eddy currents lead to an uneven current distribution within the electrical winding. Moreover, in the case of the transverse field of the slots, harmonics may occur in addition to the fundamental wave, which harmonics lead to losses during operation of the electric machine. This reduces the efficiency of the electric machine.

Furthermore, the slots may be rounded close to the air gap, with the result that the magnetic resistance is reduced close to the air gap. As a result, the transverse field of the slots is particularly pronounced in this region and the penetration depth of the harmonics is particularly high. This results in high current densities of the eddy currents.

One solution consists, for example, in forming the slots so as to be closed, i.e. said slots do not comprise openings towards the air gap. In this case, however, the transverse field of the slots can still penetrate the electrical winding.

A problem to be solved consists in providing an electric machine having increased efficiency.

The problem is solved by the subject-matters of the independent claims. Advantageous embodiments and developments are specified in the dependent claims.

According to at least one embodiment, the electric machine comprises a stator which comprises a plurality of slots and is adjacent to an air gap. The stator may comprise a stator sheet in which the slots are formed. The air gap may be arranged for example between a stator and a rotor of the electric machine.

According to at least one embodiment, the electric machine comprises a first material having a first electrical conductivity, wherein the first material in each case fills the slots partially, but not completely. The first material can thus form conductor portions or electrical windings in the slots and may be formed for example by rods or other types of winding, for example coils. The first material may be electrically conductive and may comprise copper or aluminium, for example. The first material may also comprise other materials or alloys having an electrical conductivity of preferably at least 14 Megasiemens per meter. The first material may be paramagnetic or diamagnetic.

According to at least one embodiment, the electric machine comprises a second material having a second electrical conductivity which is lower than the first electrical conductivity. The second material may for example comprise tin, bronze, titanium, stainless steels, plastics materials, liquids or gases. The second electrical conductivity may be less than 10 Megasiemens per meter. Furthermore, the second material may be paramagnetic or diamagnetic.

According to at least one embodiment of the electric machine, the second material exclusively fills an edge region of the slots, and the edge region is located in the slots on a side that faces the air gap. The second material is thus not located in a region of the slots that is not located on the side facing the air gap. The geometric shape of the second material in the slots is arbitrary. The geometric shape of the second material may be selected such that a portion of the transverse field of the slots no longer penetrates the first material in the slot.

According to at least one embodiment of the electric machine, the first material in the slots is electrically conductively interconnected on a first side of the stator. The first material in the slots may for example be interconnected on the first side of the stator by means of a short-circuit ring. The rods or electrical windings are thus interconnected so as to form a short circuit with one another. The short-circuit ring may interconnect only the first material or the entire region of the slots, i.e. also the second material.

According to at least one embodiment, the electric machine comprises a stator, the first and the second material.

The electrical and magnetic properties of the second material prevent or impede the transverse flux in the slots in the region close to the air gap. Furthermore, the current densities of the eddy currents are reduced owing to the lower electrical conductivity of the second material. As a result, the skin effect can be reduced in the region of the slots, and there are lower losses during operation of the electric machine. This also results in better efficiency.

If the second material is in addition compressible, the different thermal expansion of the first material and of the material of the stator sheet can be compensated by the second material.

According to at least one embodiment of the electric machine, the first material in each slot has the shape of a rod, wherein each rod is configured to be supplied with its own electrical phase in each case, by means of a power supply unit, on a second side of the stator. The stator can thus be configured in a manner similar to a squirrel cage rotor, wherein a short-circuit ring is attached only on the first side of the stator. On the second side of the stator, the rods in the slots are connected to a power supply unit. An individual phase per slot can thus be applied to the rods in the slots. It is also possible for groups of adjacent rods to be supplied with their own phase in each case. The rods in the slots are preferably straight. This simplifies the manufacture of the rods and the slots for example.

According to at least one embodiment of the electric machine, a third material is arranged in the slots such that the first material is electrically insulated from the material of the stator. The third material may for example comprise slot insulation. The third material may for example comprise plastics materials, polyimides, organic and non-organic materials. The third material may for example surround the first material. However, it is not necessary for the third material to completely surround the first material in the slots. The material of the stator may comprise a stator sheet for example. The slots of the stator may be formed in the stator sheet.

According to at least one embodiment of the electric machine, the second electrical conductivity is at most 10 percent of the first electrical conductivity. The lower electrical conductivity of the second material advantageously contributes to reducing the skin effects in the electrical winding.

According to at least one embodiment of the electric machine, the slots comprise an opening towards the air gap.

Alternatively, the slots do not comprise an opening towards the air gap. Furthermore, the shape of the slots may narrow or be rounded towards the air gap.

According to at least one embodiment of the electric machine, at least one first slot comprises an opening towards the air gap, and at least one second slot does not comprise an opening towards the air gap. It is thus possible for some slots to comprise an opening towards the air gap and for some other slots not to comprise an opening towards the air gap.

According to at least one embodiment of the electric machine, the second material is formed by air or the second material is different from air and/or comprises plastics material or stainless steel. In further embodiments, the second material may comprise tin, bronze, titanium, liquids or gases. If the second material is compressible, it can compensate for different amounts of thermal expansion of the first material and of the material of the stator. In this case, the geometric shape of the second material may be selected such that the different thermal expansions of the first material and of the material of the stator does not lead to mechanical stresses or leads only to low mechanical stresses.

According to at least one embodiment of the electric machine, the edge region in which the second material is located has an asymmetrical shape with respect to a radial axis of the stator. The edge region may have an oblique shape for example. The edge region may for example fill the slot to a greater extent for one radial direction than for another radial direction. An asymmetrical shape of the edge region is advantageous for electric machines having a fixed or largely constant direction of rotation.

According to at least one embodiment, the electric machine comprises a rotor which comprises a plurality of slots and is adjacent to an air gap. The rotor may be formed by a squirrel cage rotor for example. The rotor may comprise a rotor sheet in which the slots are formed. The air gap may be arranged for example between a stator and a rotor of the electric machine.

According to at least one embodiment, the electric machine comprises a first material having a first electrical conductivity, wherein the first material in each case fills the slots partially, but not completely. The first material can thus form conductor portions or electrical windings in the slots and may be formed for example by rods or other types of winding, for example coils. The first material may be electrically conductive and may comprise for example copper or aluminium. The first material may also comprise other materials or alloys having an electrical conductivity of preferably at least 14 Megasiemens per meter. The first material may be paramagnetic or diamagnetic.

According to at least one embodiment, the electric machine comprises a second material having a second electrical conductivity which is lower than the first electrical conductivity. The second material may comprise for example tin, bronze, titanium, stainless steels, plastics materials, liquids or gases. The second electrical conductivity may be less than 10 Megasiemens per meter. Furthermore, the second material may be paramagnetic or diamagnetic.

According to at least one embodiment of the electric machine, a third material is arranged in the slots such that the first material is electrically insulated from the material of the rotor. The third material may comprise a slot insulation for example. The third material may for example comprise plastics materials, polyimides, organic and non-organic materials. The third material may for example surround the first material. However, it is not necessary for the third material to completely surround the first material in the slots. The material of the rotor may comprise a rotor sheet for example. The slots of the rotor may be formed in the rotor sheet.

According to at least one embodiment of the electric machine, the second material exclusively fills an edge region of the slots, and the edge region is located in the slots on a side that faces the air gap. The second material is thus not located in a region of the slots that is not located on the side facing the air gap. The geometric shape of the second material in the slots is arbitrary. The geometric shape of the second material may be selected such that a portion of the transverse field of the slots no longer penetrates the first material in the slot.

According to at least one embodiment of the electric machine, the first material in the slots is electrically conductively interconnected on a first side of the rotor. The first material in the slots may for example be interconnected on the first side of the rotor by means of a short-circuit ring. The rods or electrical windings are thus interconnected so as to form a short circuit with one another. The short-circuit ring may interconnect only the first material or the entire region of the slots, i.e. also the second material.

According to at least one embodiment, the electric machine comprises a rotor, the first, the second and the third material.

The electrical and magnetic properties of the second material prevent or impede the transverse flux in the slots in the region close to the air gap. Furthermore, the current densities of the eddy currents are reduced owing to the lower electrical conductivity of the second material. As a result, the skin effect can be reduced in the region of the slots, and there are lower losses during operation of the electric machine. This therefore results in better efficiency.

If the second material is in addition compressible, the different thermal expansions of the first material and of the material of the rotor sheet can be compensated by the second material.

According to at least one embodiment of the electric machine, the second electrical conductivity is at most 10 percent of the first electrical conductivity. The lower electrical conductivity of the second material advantageously contributes to reducing the skin effects in the electrical winding.

According to at least one embodiment of the electric machine, the slots comprise an opening towards the air gap. Alternatively, the slots do not comprise an opening towards the air gap. Furthermore, the shape of the slots may narrow or be rounded towards the air gap.

According to at least one embodiment of the electric machine, at least one first slot comprises an opening towards the air gap, and at least one second slot does not comprise an opening towards the air gap. It is thus possible for some slots to comprise an opening towards the air gap and for some other slots not to comprise an opening towards the air gap.

According to at least one embodiment of the electric machine, the second material is formed by air or the second material is different from air and/or comprises plastics material or stainless steel. In further exemplary embodiments, the second material may comprise tin, bronze, titanium, liquids or gases. If the second material is compressible, it can compensate for different amounts of thermal expansion of the first material and of the material of the rotor. In this case, the geometric shape of the second material may be selected such that the different thermal expansions of the first material and of the material of the rotor do not lead to mechanical stresses or lead only to low mechanical stresses.

According to at least one embodiment of the electric machine, the edge region in which the second material is located has an asymmetrical shape with respect to a radial axis of the rotor. The edge region may have an oblique shape for example. The edge region may for example fill the slot to a greater extent for one radial direction than for another radial direction. An asymmetrical shape of the edge region is advantageous for electric machines having a fixed or largely constant direction of rotation.

According to at least one embodiment, the electric machine comprises the stator and the rotor, wherein the rotor is arranged on the side of the air gap facing away from the stator.

The electric machine described herein will be explained in greater detail in the following, in conjunction with exemplary embodiments and the accompanying Figures.

FIG. 1A shows a detail of a cross-section of an exemplary stator sheet with a closed slot.

FIG. 1B shows a detail of an exemplary cross-section of a stator sheet with an open slot.

FIG. 2 shows two slots, by way of example, which slots are completely filled with a first material.

FIG. 3 shows closed slots, by way of example, in a stator and in a rotor, which slots are completely filled with a first material.

FIG. 4 shows a detail of a cross-section of an exemplary embodiment with open slots in the stator and in the rotor.

Figure 5:
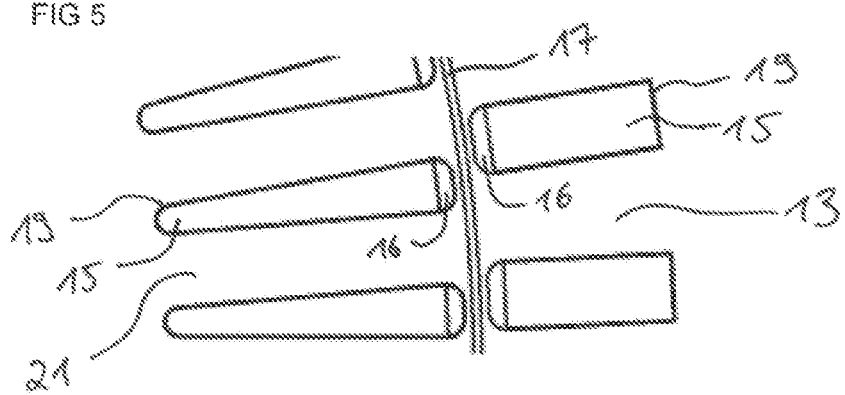
FIG. 5 shows a detail of a cross-section of an exemplary embodiment with closed slots in the stator and in the rotor.

FIG. 1A shows a detail of a cross-section of an exemplary stator sheet 13 with a closed slot 14. The first material 15, the second material 16 and the third material 19 are located in the slot 14. The first material 15 may correspond to a rod of the electrical winding having a round, elliptical or angular cross-section for example, and does not fill the slot 14 completely. The second material 16 is exclusively located in an edge region 20 of the slot 14, wherein the edge region 20 is located in the slot 14 on the side facing the air gap 17. The third material 19 is arranged so as to electrically insulate the first material 15 from the stator sheet 13.

FIG. 1B shows a detail of a cross-section through an exemplary stator sheet 13 with a slot 14, which comprises an opening 18 towards the air gap 17. The first material 15, the second material 16 and the third material 19 are arranged in the slot 14.

FIG. 2 shows two slots 14, by way of example, which are arranged in a rotor sheet 21 and which comprise openings 18 towards the air gap 17. The first material 15 completely fills the slots 14. This design is common for squirrel-cage rotors in asynchronous machines.

FIG. 3 shows closed slots 14, by way of example, in a stator sheet 13 and in a rotor sheet 21. The first material 15 completely fills the slots 14. Since the slots 14 do not comprise an opening 18 towards the air gap 17, the harmonics of the transverse field of the slots are damped.

FIG. 4 shows a detail of a cross-section of an exemplary embodiment comprising slots 14 in a stator sheet 13 and in a rotor sheet 21. The slots 14 comprise openings 18 towards the air gap 17. The first material 15, the second material 16 and the third material 19 are located in the slots 14. The first material 15 does not completely fill the slots 14 and the second material 16 is located in an edge region 20 of the slots 14 which is located in the slots 14 on the side facing the air gap 17. The third material 19 is arranged such that the first material 15 is electrically insulated against the stator sheet 13. In the case of the stator sheet 13 shown, the second material 16 may comprise air for example. In this case, the slots 14 can be formed so as to be open towards the air gap 17. The shape of the slots 14 may be rounded or narrower toward the air gap 17. The stator sheet 13 and the rotor sheet 21 may be formed by stacked sheets with slots 14.

FIG. 5 shows a detail of a cross-section of an exemplary embodiment comprising closed slots 14 in a stator sheet 13 and in a rotor sheet 21. The slots 14 therefore do not comprise an opening 18 towards the air gap 17.

Figure 6:
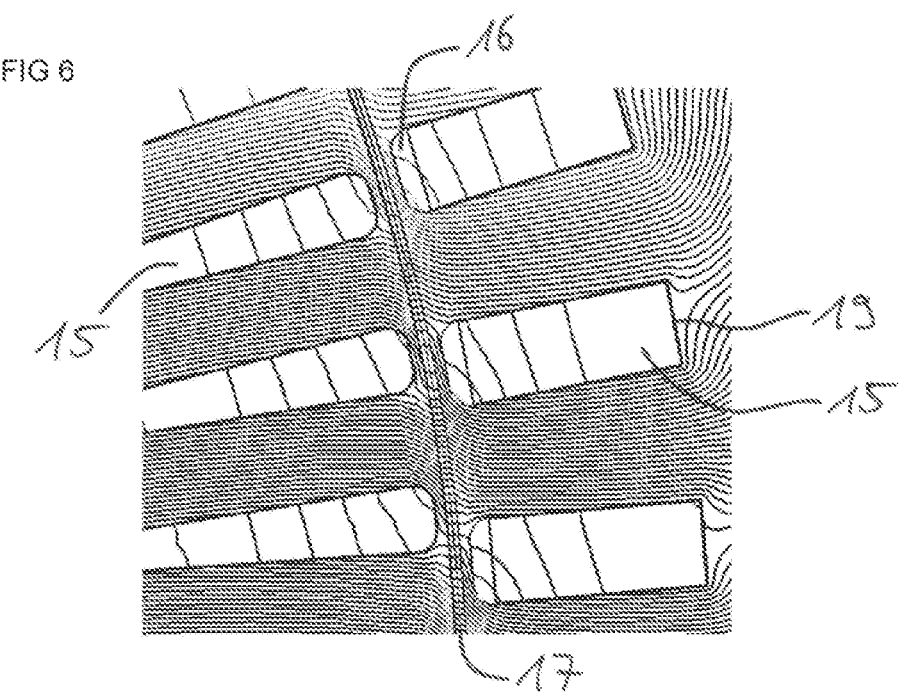
FIG. 6 shows an exemplary transverse field of the slots, in a cross-section of an exemplary embodiment.

FIG. 6 shows a transverse field of the slots 14, by way of example, in a stator 11 and in a rotor 12. The stator 11 and the rotor 12 comprise closed slots 14. In the rotor 12, the slots 14 are completely filled with the first material 15. In the stator 11, the slots 14 are filled partially with the first material 15 and partially with the second material 16. In all the slots 14 in the stator 11 and in the rotor 12, the third material 19 is arranged such that the first material 15 is electrically insulated against the stator and rotor sheets 13, 21. In the slots 14 in the rotor 12, the transverse field of the slots 14 penetrates the first material 15 over the entire region of the slots 14. In the slots 14 in the stator 11, the transverse field does not completely penetrate the first material 15, since the second material 16 is located in the slots 14 so as to be close to the air gap 17. The second material 16 in the slots 14 can thus impede the transverse flux in the slots 14 and reduce the locally increased current densities. Better efficiency of the electric machine 10 can thus be achieved.

Figure 7:
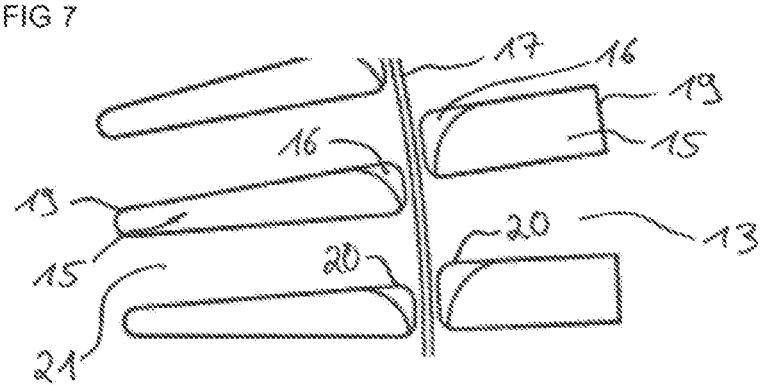
FIG. 7 shows a detail of a cross-section of a further exemplary embodiment with closed slots.

FIG. 7 shows a detail of a cross-section of a further exemplary embodiment comprising slots 14 in the stator 11 and in the rotor 12. The first material 15, the second material 16 and the third material 19 are located in the slots 14. In this exemplary embodiment, the edge region 20 in which the second material 16 is located has an asymmetrical shape with respect to a radial axis of the stator 11. The edge region 20 can thus be of oblique design. The edge region 20 can also be of other asymmetrical shapes. This exemplary embodiment is advantageous for machines having a direction of rotation that is fixed or remains largely constant.

LIST OF REFERENCE CHARACTERS

10: electric machine
11: stator
12: rotor
13: stator sheet
14: slot
15: first material
16: second material
17: air gap
18: opening
19: third material
20: edge region
21: rotor sheet

The invention claimed is:
1. An electric machine, comprising:
a stator which comprises a plurality of slots and is adjacent to an air gap,
a first material having a first electrical conductivity, wherein the first material in each case fills the slots partially, but not completely, and a second material having a second electrical conductivity which is lower than the first electrical conductivity, wherein the second material exclusively fills an edge region of the slots and the edge region is located in the slots on the side facing the air gap, the first material in the slots is electrically conductively interconnected on a first side of the stator, and the first material in the slots being connected to each other via a short-circuit ring on the first side of the stator.

2. The electric machine according to claim 1, in which the first material in each slot has the shape of a rod, wherein each rod is configured to be supplied with its own electrical phase in each case, by means of a power supply unit, on a second side of the stator.

3. The electric machine according to claim 1, in which a third material is arranged in the slots such that the first material is electrically insulated from the material of the stator.

4. The electric machine according to claim 1, in which the second electrical conductivity is at most 10% of the first electrical conductivity.

5. The electric machine according to claim 1, in which the slots comprise an opening or do not comprise an opening towards the air gap.

6. The electric machine according to claim 1, in which at least a first slot comprises an opening towards the air gap and at least a second slot does not comprise an opening towards the air gap.

7. The electric machine according to claim 1, in which the second material is formed by air or the second material is different from air and/or comprises plastics material or stainless steel.

8. The electric machine according to claim 1, in which the edge region in which the second material is located has an asymmetrical shape with respect to a radial axis of the stator.

9. An electric machine, comprising:
at least one rotor which comprises a plurality of slots and is adjacent to an air gap, a first material having a first electrical conductivity, wherein the first material in each case fills the slots partially, but not completely, a second material having a second electrical conductivity which is lower than the first electrical conductivity, a third material which is arranged in the slots such that the first material is electrically insulated from the material of the rotor, wherein the second material exclusively fills an edge region of the slots and wherein the edge region is located in the slots on the side facing the air gap, the first material in the slots is electrically conductively interconnected on a first side of the rotor, and the second material is different than air.

10. The electric machine according to claim 9, in which the second electrical conductivity is at most 10% of the first electrical conductivity.

11. The electric machine according to claim 9, in which the slots comprise an opening or do not comprise an opening towards the air gap.

12. The electric machine according to claim 9, in which at least a first slot comprises an opening towards the air gap and at least a second slot does not comprise an opening towards the air gap.

13. The electric machine according to claim 9, in which the second material comprises plastics material or stainless steel.

14. The electric machine according to claim 9, in which the edge region in which the second material is located has an asymmetrical shape with respect to a radial axis of the rotor.

15. An electric machine according to claim 1, comprising a rotor according to claim 9, wherein the rotor is arranged on the side of the air gap facing away from the stator.

* * * * *